Feb. 6, 1962 R. R. YOERGER 3,019,829
APPARATUS FOR SEGMENTING CORNCOBS
Filed Sept. 3, 1959 2 Sheets-Sheet 1
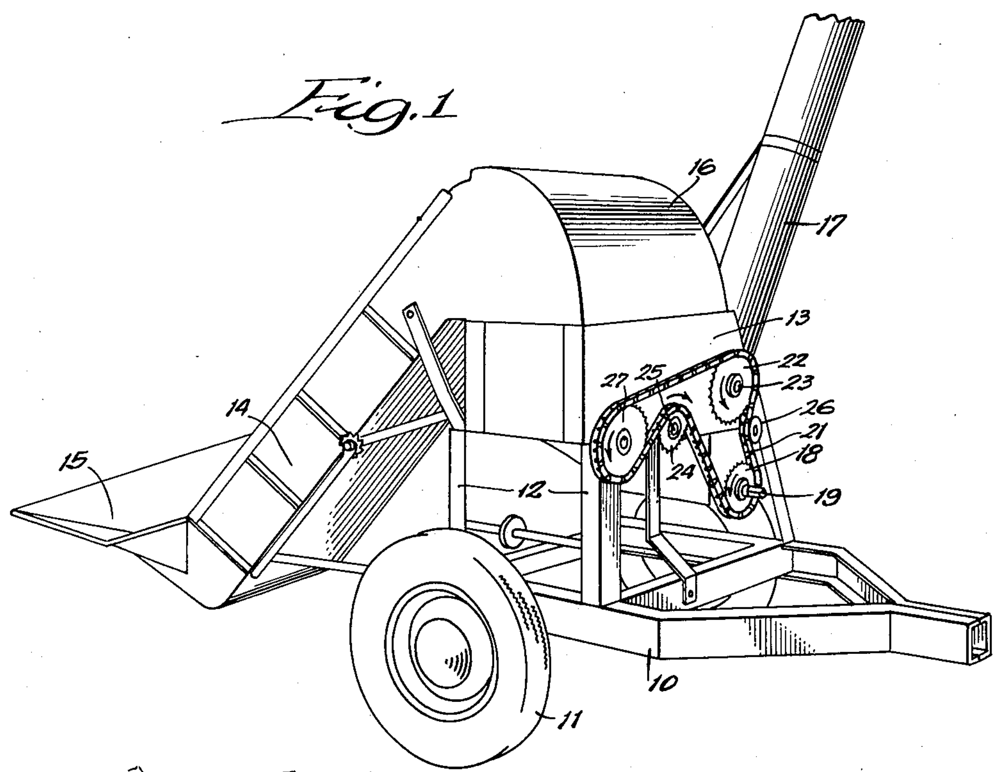
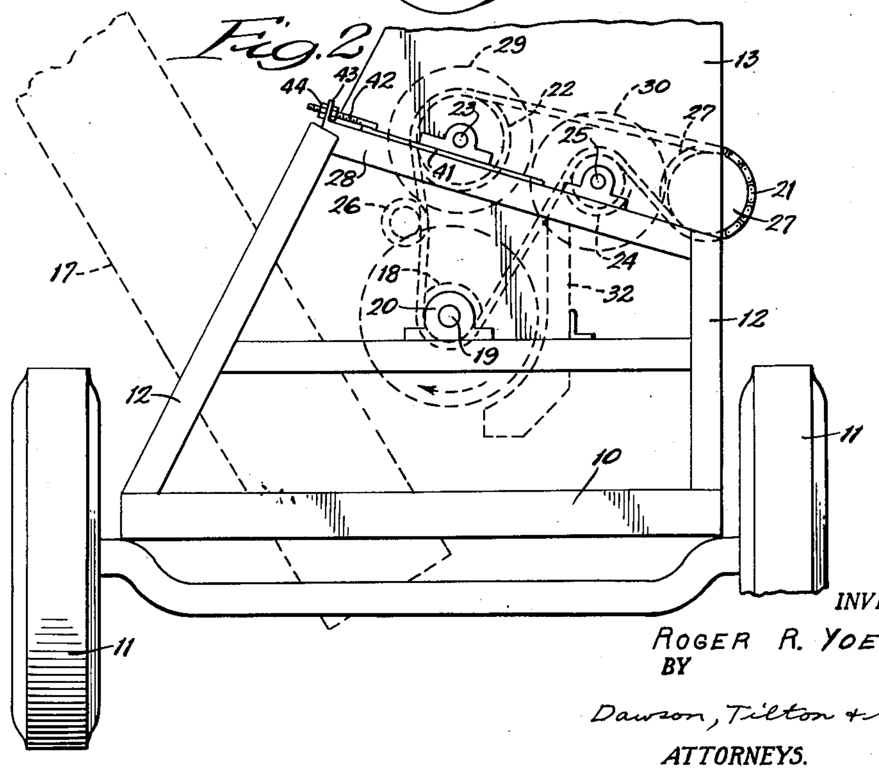
INVENTOR:
ROGER R. YOERGER
BY
Dawson, Tilton & Graham,
ATTORNEYS.

Feb. 6, 1962 R. R. YOERGER 3,019,829
APPARATUS FOR SEGMENTING CORNCOBS
Filed Sept. 3, 1959 2 Sheets-Sheet 2
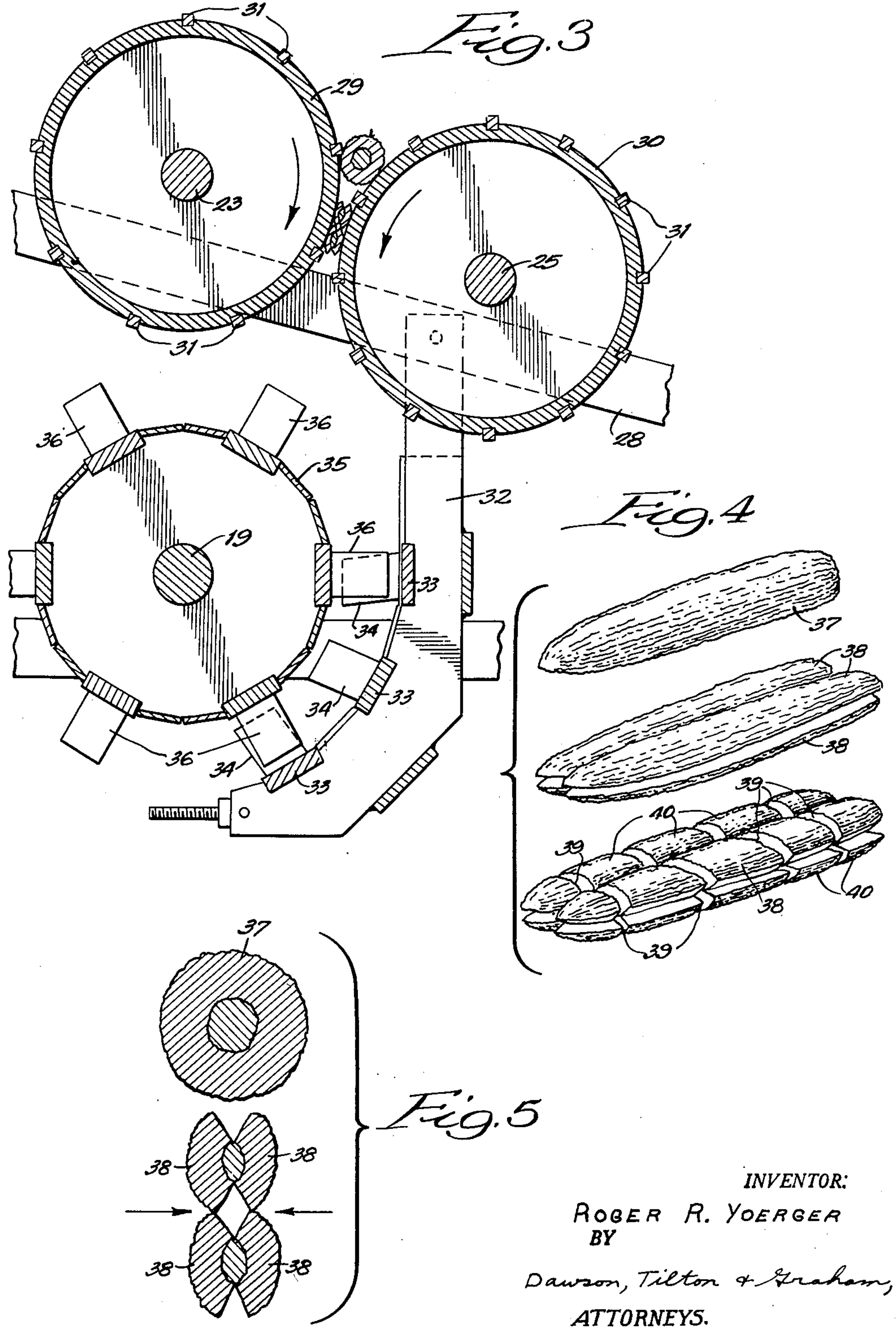
INVENTOR:
ROGER R. YOERGER
BY
Dawson, Tilton & Graham,
ATTORNEYS.

United States Patent Office 3,019,829 Patented Feb. 6, 1962

3,019,829

APPARATUS FOR SEGMENTING CORNCOBS

Roger R. Yoerger, Champaign, Ill., assignor to Iowa State College Research Foundation, Ames, Iowa, a corporation of Iowa Filed Sept. 3, 1959, Ser. No. 838,374
4 Claims. (Cl. 146—117)

This invention relates to a crusher device, and, more particularly, to a crusher adapted to crush corncobs, etc. for the purpose of forming a stock or poultry litter and other products.

This application is a continuation-in-part of my copending application, Serial No. 582,540, filed May 3, 1956, now abandoned, the last-mentioned application being a division of my application Serial No. 331,780, filed January 19, 1953, which is now Patent No. 2,766,795.

In the crushing of corncobs, etc. with mechanisms now available, it is found that a very substantial amount of dust is formed, which dust is not only undesirable in the handling and transporting of the product, but also when the same is delivered and placed within a stock or poultry building. Further, the dust itself is largely lost and becomes ineffective as a litter. The devices now available for treating corncobs also are of sharply limited capacity, and efforts to operate such devices at a higher speed result in a greater formation of dust.

An object of the present invention is to provide a machine for crushing corncobs, etc. in such a manner as to avoid dust formation while at the same time producing corncob segments which are usable as an effective litter quantitatively. A further object is to provide mechanism in which corncobs are split first in longitudinal segments and then cut transversely to produce sizable chunks or pieces of corncobs having relatively no dust therein and which are employed as an entirety in the forming of litter.

A still further object is to provide an adjustable mechanism effective for separating corncobs into long segments while at the same time delivering the segments automatically to a desired destination and in substantially uniform pieces. A still further object is to provide mechanism for carrying corncobs to a zone in which the cobs are broken into substantially uniform segments while delivering the segments therefrom to a desired destination. A still further object is to provide a method and means for breaking corncobs into sizable and relatively uniform chunks highly desirable for litter, while substantially eliminating the formation of dust. Other specific objects and advantages will appear as the specification proceeds.

The invention is shown in an illustrative embodiment by the accompanying drawings, in which—

FIG. 1 is a perspective view of a mechanism embodying my invention;

FIG. 2 is an enlarged fragmentary elevational view showing a portion of the mechanism in dotted line, this view being taken from the inside of the machine looking outwardly and to the right in FIG. 1;

FIG. 3 is an enlarged cross-sectional view showing the crushing rollers and cutting blades of the mechanism, this view being taken from inside the machine shown in FIG. 1 and looking outwardly and to the right thereof;

FIG. 4 is a perspective view showing changes in a corncob as it passes through the mechanism shown in FIG. 3; and FIG. 5 is an enlarged transverse sectional view showing the corncob prior to and after the crushing step.

I have discovered that corncobs may be quickly and effectively broken into relatively uniform segments by passing the corncobs through breaker or crushing rollers by which the cob is split longitudinally into four parts and the split cob portions then subjected to transverse cutting, as illustrated more clearly in FIGS. 3 and 4. I have also conceived of an apparatus for carrying out such segmenting operations, and will now describe the same.

In the illustration given in FIGS. 1 to 3, 10 designates a frame carried upon wheels 11. Standards 12 extend upwardly from the frame 10 and support a casing 13 at a spaced distance above the trailer-like frame 10. A conveyor 14 equipped with a flared mouth portion 15 is adapted to carry corncobs from the flared mouth portion 15 which serves as an inlet upwardly and through an apron casing 16 and deposit the cobs within the crusher roller casing 13. A second conduit 17 is arranged to receive the crushed cobs and to carry them upwardly to a truck bin or other receiver (not shown). Since conventional elevators may be used for the elevator structures 14 and 17 shown in the drawing, it is believed unnecessary to describe the structures 14 and 17 in detail herein.

As shown more clearly in FIGS. 1 and 2, a drive sprocket 18 mounted upon a shaft 19 is supported by means of bearings 20 secured to cross members **20*a* extending between standards 12, as can be best seen in FIG. 2. The end of the shaft 19 is connected by a coupler (not shown) to a power take-off shaft of a tractor (not shown), or of any other suitable source of power. A chain 21 connects a sprocket 22 mounted upon the crusher roller shaft 23, and it also connects the sprocket 24 mounted upon the crusher roller shaft 25. I provide idler sprockets 26 and 27 in the path of travel of chain 21. These sprockets or gears designated 26 and 27 can be made movable by means not shown but well known to the art. Thus, the angular relation of sprockets 22 and 24 can be changed. These sprockets are associated through their respective shafts 23 and 25 with rollers 29 and 30. Each roller 29 and 30 is equipped with longitudinally-extending bars 31. Changing the relative angular positions of sprockets 22 and 24 results in a corresponding change in position of the bars 31 on roller 29 with respect to those on roller 30, thereby preventing interference between the bars 31 on the rollers 49 and 30. The standards 12 which are shown in FIG. 2 are seen to be provided at their ends opposite the ends secured to the horizontal portion of frame 10, with inclined rails 28, on which are mounted the crusher rollers 29 and 30**.

The relative positions of bars 31 on rollers 29 and 30 may be changed by shifting the idler sprockets 26 and 27. By shifting either of the idler sprockets 26 and 27 so as to loosen chain 21, either sprocket 22 or 24 can be temporarily disengaged from the chain and rotated to a new angular position. I prefer to drive the roller 30 faster than the roller 29. The relative speed between the rollers 29 and 30 provides for somewhat better separation of the quartered particles. The relative speed is especially effective with corncobs of high moisture content, and also results in maintaining the rollers 29 and 30 in a clean condition. The speeds of the rollers are so adjusted as to allow two bars 31 of roller 30 to mesh between adjacent bars 31 on roll 29. Thus, the bars on the two rolls are never directly opposite each other and do not pass in the quartering zone. To provide this type of operation with rolls having nine and twelve bars, respectively, as shown in FIG. 3 relative to rolls 29 and 30, it is desirable to have a speed ratio of 3:2 between the fast and the slow rolls.

As the conveyor 14 brings the corncobs upwardly and discharges them through the casing 16 onto the rollers 29 and 30, the difference in speed of the rollers causes the corncobs to be readily aligned between the rollers; and with the cobs lined up horizontally, an effective quartering of the cobs is brought about.

To provide for superior crushing of the cobs longitudinally to effectuate the desired quartering action, I maintain the rollers 29 and 30 a spaced distance apart sufficient to compress a cob about one-half inch. I have found that when a cob is compressed laterally, it will break into quarters along the entire length of the cob. When the moisture content of the cob is lower than 15% or 20%, the division is complete, and with completely dry cobs, a compression distance of about three-quarters of an inch results in the cob being broken into smaller pieces. Especially effective quartering is achieved when the rollers 29 and 30 are each of a diameter of about eleven inches. With this size diameter or larger, a cob may be gripped on nearly opposite sides of its center line and therefore is pulled between the rolls rather than tending to ride up on the rolls.

Extending below the roller 30 and forwardly thereof is a catch trough 32, which directs the corncob pieces forwardly and delivers them into the lower portion of the machine for removal by a screw conveyor 17. The catch trough 32 is provided with transverse supports 33, and carries spaced teeth 34. Adjacent the catch trough 32 is a cylindrical sizing unit 35 provided with circumferentially-spaced breaker elements 36. The elements 36, as the unit 35 is rotated, pass through the longitudinally-spaced teeth 34 on the catch trough 32 and break the quartered cobs transversely, as is indicated in the lower sketch of FIG. 4. The action of the unit 35 may be considered one of separating the quartered particles and sizing them into the desired length. This action may involve some shearing, but the teeth are preferably not sharpened and the length reduction is mainly the result of a tooth 34 breaking the quartered particles which are supported by two elements 36. In this way, the length reduction is obtained by a relatively simple mechanism and the energy requirement is lower, since the brittle quarters fail under tension with simple beam loading.

As indicated in FIG. 4, the original cob 37 is crushed to form the quartered longitudinal segments 38, and the quartered segments 38 are then broken transversely, as indicated at 39. Thus, in the two operations described, the original cob is quartered and then the quartered portions are severed transversely to form the relatively uniform chunks 40, which fall into the lower portion of the machine adjacent the inlet to conveyor 17, and are then carried up by the conveyor 17 to a storage container, etc. As above indicated, the shaft 19 on which the unit 35 is supported may be coupled directly to the power take-off of the tractor and the crusher rollers are then driven directly from a pulley or drive sprcoket mounted on the shaft 19 by means of a belt or chain which engages the sprockets mounted on shafts 23 and 25. Any suitable means for adjusting the roller 29 closer to or farther from the roller 30 may be employed. In the specific illustration given in FIG. 2, slide 41 carries the bearing **23*a* for the shaft 23, and the slide is adjustable by means of a screw 42 anchored to the slide 41 and threadedly engaging a fixed bracket 43. A nut 44 may be employed for advancing or retracting the slide 41 on frame member 28**.

*Operation*

In the operation of the apparatus, the wheel-equipped machine is moved to a point where the entrance 15 of the elevator 14 is adjacent a pile of cobs (not shown). The cobs 37, as they are fed to the elevator 14, are carried up and deposited into the casing 16 over the V-shaped area 45 (indicated in FIG. 3) between the rollers 29 and 30. By reason of the inclination shown and the speed ratio between these rollers, the cobs are quickly aligned longitudinally thereof. As the cobs are carried between the rollers, as shown in FIG. 3, a quartering action takes place, as indicated in FIG. 5. The cob sections then fall upon the cutter device below and the blades 34 and 36 sever the cobs, as indicated at the bottom of FIG. 4. The segmented parts then fall into the inlet of the conveyor 17 near the bottom of the machine, and the screw conveyor

17 carries the segments upwardly and into a truck, bin or other container.

In the foregoing operation, substantially no dust is formed, the quartering being effected by the pressure of the two rollers and the bars 31 carried thereby, the quartered cobs being then cut to form segments of each quarter. Ordinarily, however, the segments as indicated in the drawing are highly effective in the forming of litter. In the specific illustration given, the final size of each corncob varies from ¾" to 1½", and is effective for absorbing 200% to 300% of its own dry weight in moisture. While this size is particularly desirable for use in a litter, the sizes may be varied widely for different uses.

I find that dust is largely avoided by the sequence of steps in that the quartering of the cobs is accomplished by a pressure operation, splitting the cob into quarters as indicated, and then in the transverse severing operation the greatly weakened quarters of the cob severing or breaking easily without the forming of dust. By moving one or both of the idler gears or sprockets, the relative position of the two rolls can be readily changed. The inclination of the inclined rails 28 toward the crushing rollers is approximately 15 degrees. Such angle, however, may be modified when different sized cobs are being crushed so as to effectively line the cobs up horizontally. The catch trough 32 is effective as a support for holding the stationary teeth 34 in spaced relation with the breaker elements or teeth 36 of the sizing unit or cutter roller 35, while at the same time the catch trough directs the cob fragments into the lower portion of the helical elevator 17.

While, in the foregoing specification, I have shown a specific structure in considerable detail for the purpose of illustrating an embodiment of the invention, it will be understood that such details of structure may be varied widely by those skilled in the art without departing from the spirit and scope of my invention.

I claim:

1. In apparatus for segmenting corncobs, a frame, a pair of rollers rigidly, rotatably supported on said frame with the axes thereof disposed in parallel, side-by-side relation, means on said frame supporting the axis of one roller higher than the axis of the other roller, means on said frame for rotating said rollers toward each other at the tops thereof, said rotating means including means for rotating the lower of said rollers faster than the upper of said rollers, each of said rollers being equipped with a plurality of axially extending bars spaced about the periphery thereof, said rollers being sized to grip a cob on nearly opposite sides of the center line and spaced apart about one-half inch, and a rotatable knife mounted on said frame below said rollers for cutting action transverse to the axes of said rollers whereby said knife is adapted to sever the elongated cob strips provided by the action of said rollers transversely thereof into segments of relatively uniform size.

2. In apparatus for dividing corncobs into relatively uniform pieces, a frame, a pair of similarly sized rollers supported for rotation on said frame, means for rotating said rollers toward each other at the tops thereof and at different rates of speed, each of said rollers being equipped with a plurality of longitudinally-extending bars spaced about the peripheral surfaces thereof, means for feeding corncobs between said rollers, said rollers being sized to grip a cob on nearly opposite sides of its center line, a cutter roller suported on said frame for rotation below the first-mentioned rollers and being equipped with a plurality of spaced-apart knives, means for rotating said cutter roller, and a frame member mounted on said frame adjacent said cutter roller and being equipped with a plurality of spaced-apart knives adapted to cooperate with the first-mentioned knives in severing corncobs along transverse lines, said first-mentioned rollers being adapted to split corncobs into quarters along longitudinal lines and to drop the quartered cobs onto said cutter roller, whereby said knives are operative to transversely sever the cobs, means on said frame supporting one of the said first-mentioned rollers with its axis parallel to and above the axis of the other, said supporting means including means for rigidly, positionably suporting said one roller relative ot the other.

3. In apparatus for dividing corncobs into relatively uniform pieces, a frame, a pair of similarly sized rollers rigidly supported on said frame for rotation about parallel axes, means on said frame for rotating said rollers toward each other at the tops thereof, each of said rollers being equipped with a plurality of longitudinally-extending bars spaced about the peripheral surfaces thereof, means for feeding corncobs between said rollers, said rollers being sized to grip a cob on nearly opposite sides of its center line, a cutter roller supported on said frame for rotation below the first-mentioned rollers and being equipped with a plurality of spaced-apart knives, means on said frame for rotating said cutter roller, and a frame member mounted on said frame adjacent said cutter roller and being equipped with a plurality of spaced-apart knives adapted to cooperate with the first-mentioned knives in severing corncobs along transverse lines, said first-mentioned rollers being adapted to split corncobs into quarters along longitudinal lines and to drop the quartered cobs onto said cutter roller, whereby said knives are operative to transversely sever the cobs, means on said frame supporting one of the first-mentioned rollers higher than the other, means on said frame for rotating the lower of said first-mentioned rollers faster than the higher, the faster-rotating roller of said first-mentioned rollers being equipped with more of said bars than the slower-rotating of said first-menioned rollers.

4. In apparatus for dividing corncobs into reltaively uniform pieces, a support structure, a pair of rollers, bearing means on said structure rigidly, rotatably supporting said rollers in parallel relation with the axis of one roller higher than the axis of the other roller, means for rotating said rollers toward each other at the tops thereof and for rotating the higher of said rollers slower than the lower of said rollers, said rollers being sized to grip a cob on nearly opposite sides of its center line, each of said rollers being equipped with a plurality of longitudinally-extending bars spaced apart about the peripheral surface thereof, means for feeding corncobs between said rollers, and a rotatable knife member mounted on said support structure below said rollers and adapted to sever the elongated cob strips provided by the action of said rollers transversely thereof into segments of relatively uniform size, a line connecting the axes of said pair of rollers being at an angle of about 15° with the horizontal, said bearing means being selectively, relatively movable parallel to said line to vary the spacing between said rollers.

References Cited in the file of this patent

UNITED STATES PATENTS

| | | |
|---|---|---|
| 111,913 | Daniels | Feb. 21, 1871 |
| 654,839 | Philpott | July 31, 1900 |
| 680,755 | Bloom | Aug. 20, 1901 |
| 1,061,401 | Penn | May 13, 1913 |
| 1,121,684 | Spangler | Dec. 22, 1914 |

FOREIGN PATENTS

| | | |
|---|---|---|
| 72,402 | Germany | Jan. 4, 1894 |